United States Patent [19]

Rodriguez

[11] Patent Number: 4,945,343
[45] Date of Patent: Jul. 31, 1990

[54] SYSTEM AND METHOD FOR DETECTION OF MALFUNCTIONING STEAM TRAPS

[75] Inventor: Richard Rodriguez, Houston, Tex.

[73] Assignee: Shell Oil Company, Houston, Tex.

[21] Appl. No.: 374,377

[22] Filed: Jun. 30, 1989

[51] Int. Cl.⁵ .......................................... G08B 21/00
[52] U.S. Cl. ................................. 340/606; 374/147;
 73/200; 137/171; 137/185
[58] Field of Search .................. 73/200; 137/185, 187, 137/171; 200/61.05; 374/102, 103, 147, 141; 340/606

[56] References Cited

U.S. PATENT DOCUMENTS

| | | | |
|---|---|---|---|
| 4,308,889 | 1/1982 | Lin | 137/187 |
| 4,456,173 | 6/1984 | Miner et al. | 73/200 |
| 4,630,633 | 12/1986 | Vallery | 137/185 |
| 4,705,212 | 11/1987 | Miller | 137/171 |
| 4,727,750 | 3/1988 | Yonemura | 73/46 |
| 4,746,223 | 5/1988 | Miyata et al. | 137/187 |
| 4,764,024 | 8/1988 | Ryan | 73/200 |

Primary Examiner—Joseph A. Orsino
Assistant Examiner—Jill Jackson
Attorney, Agent, or Firm—Ronald R. Reper

[57] ABSTRACT

A system and method for detecting malfunctioning of a steam trap is disclosed employing malfunction detecting means, signal generating means and signal indicating means.

5 Claims, 1 Drawing Sheet

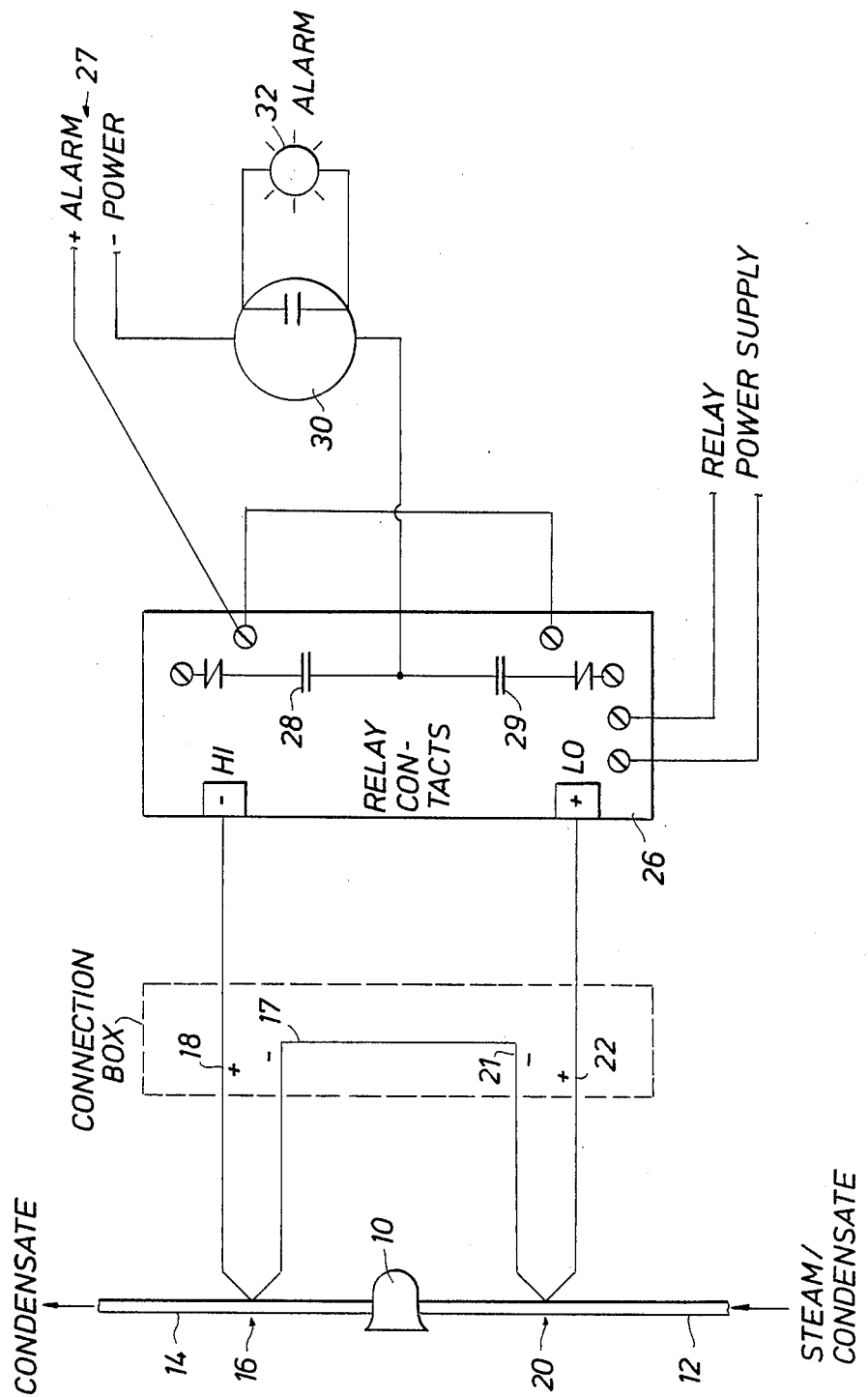

SYSTEM AND METHOD FOR DETECTION OF MALFUNCTIONING STEAM TRAPS

BACKGROUND OF THE INVENTION

The present invention relates to a system and method for detection of malfunctioning steam traps. In modern chemical technology steam is the second (after water) most important process fluid. Steam is used for the distribution of heat under controlled temperature conditions, for the generation of power, as a smothering material in fire protection, as a reacting medium, and as a cleaning agent and many other purposes. Applications of steam extend over a range of pressures from a few inches of water to several, e.g., fifteen thousand pounds per square inch and corresponding saturated temperatures.

Steam is generated by heating water in any of a variety of boilers using heat from combustion of any of natural gas, coal, fuel oil, waste products, by cooling of hot liquid or gaseous process streams., or from nuclear fission reactions. The steam is distributed from the generator to the site of application in a conduit system which may extend some distance from the generator.

There are two commonly encountered problems in steam distribution systems. Air continuously enters a steam system because of incomplete de-aeration of boiler feedwater. Loss of heat in the distribution system results in formation of liquid water, also called condensate. In order to selectively purge non-condensable gases (mostly air) and condensate in the distribution system to help maintain high heat transfer coefficients in equipment without losing live, i.e., process-pressure, steam, it is common practice to employ one or more steam traps.

Malfunction of a steam trap can markedly affect the efficiency of a process. For example, steam is often employed in tracing service wherein a process fluid must be kept above its freezing point. Process fluids such as asphalt, heavy oils and sulfur must be kept close to the steam saturation temperature as even a slight backup of condensate could cause the process fluid to solidify. Frequent manual testing of steam traps is labor intensive. A system and continuous process for detecting malfunctioning steam traps has now been devised.

SUMMARY OF THE INVENTION

According to the invention there is provided a system for detecting malfunctioning of a steam trap which comprises
sensing means adapted to be disposed proximate to a steam trap to detect malfunctioning of said trap,
signal generating means operatively connected to said sensing means for generating a signal upon malfunctioning of said trap, and
signal indicator means responsive to said generated signal for indicating malfunctioning of said steam trap.

The invention further provides an array of comprising a plurality of the foregoing systems, each said sensing means being operatively disposed proximate to at least two individual steam traps, and having signal generating means operatively connected with said sensing means, and having at least two of said steam traps being disposed remotely from each other, said array having a signal indicator corresponding to each of said at least two steam traps, said signal indicators being disposed in a common location.

The invention further provides a method for detecting malfunctioning of a steam trap having an inlet operatively connected to a source of steam and having an outlet, which method comprises
continuously sensing for the flow of steam at said outlet,
when said flow exceeds conditions representative of a properly functioning steam trap generating a signal which indicates malfunctioning of said steam trap, and activating a signal indicator in response to said signal.

BRIEF DESCRIPTION OF THE DRAWINGS

The drawing is a schematic representation of a preferred embodiment according to the invention.

DESCRIPTION OF PREFERRED EMBODIMENTS

A steam trap may be considered as a valve that remains closed in the presence of process steam, but self actuates to discharge gases which are non-condensable, such as air, and condensate. This selective purging of a steam system helps to maintain high heat-transfer coefficients in equipment without losing process pressure steam. The term "steam trap" or "trap" as used in this specification also includes a "Sarco pot" having like function in steam environments operating under vacuum, i.e., less than atmospheric pressure.

There are three principal types of steam traps used in industry. These are: (1) thermostatic, which operate on the principle that steam is hotter than either condensate or steam which is contaminated with non-condensables; (2) mechanical, which operate on the difference in density between steam and condensate., and (3) thermodynamic, which use the release of flash steam to close the condensate discharge valve. The term flash steam herein refers to steam formed when condensate is discharged at higher than the saturation temperature at the outlet pressure. Generally this flash steam is not considered to be lost steam since the trap discharges only water.

Traps may malfunction because of: (1) gradual wear and/or corrosion, (2) mechanical failure of a component or by lodging of a solid particle in the valve seat or operating mechanism resulting in precipitous malfunction (letting the steam blow by or closing the condensate-discharge system); or (3) change in conditions which temporarily locks the valve in one position until the conditions are corrected and normal operation of the restored. Failure to detect a malfunctioning steam trap can result not only in energy losses, but in accumulation of condensate in process steam lines associated with rotating equipment such as turbines and the like. Undue accumulation of condensate can result in mechanical damage or even failure of such equipment.

The invention will now be described in more detail, by way of example only, with reference to the accompanying drawing. A steam trap generally indicated with the reference numeral 10 is disposed on process steam supply conduit 12 which conduit is operatively connected to a supply of process steam., from steam trap 10 condensate (and flash steam) is discharged via discharge conduit 14. The trap failure detection system of this invention comprises three principal components: (a) sensing means disposed proximate to said steam trap for sensing malfunction of said steam trap; (b) signal generating means operatively connected to said sensing means to generate a signal indicative of malfunction, and (c) signal indicator means responsive to said signal generating means for indicating malfunction of said steam trap.

The steam flow sensing means in a preferred embodiment comprises a first thermocouple 16 disposed proximate to said steam trap 10 and in temperature measuring relationship on discharge conduit 14, and a second thermocouple 20 disposed proximate to said steam trap and in temperature measuring relationship on process steam supply conduit 12. Said first and second thermocouples, which may be, e.g., Type T copper (+)-Constantin (−) thermocouples, each have a positive and a negative lead. In a particularly preferred embodiment negative lead 17 of said first thermocouple 16 is operatively connected to the negative lead 21 of said second thermocouple 20. From said first thermocouple 16 the positive lead 18 is connected to the negative input terminal on an adjustable dual-thermocouple/millivolt alarm relay device 26. From said second thermocouple 20 positive lead 22 is connected to the positive input on said adjustable thermocouple/millivolt alarm device 26. Said thermocouple/millivolt alarm 26 is operatively connected to signal generating means relay 30, here represented by a loop which is electrically powered from a source 27, said loop may be is closed by either of the pair of contacts 28 or 29 on relay 26. The electrical source typically will be a low voltage source of direct current, e.g., 24 volts D.C. Said relay contacts 28 and 29 are adjusted so that if the temperature from said first thermocouple 16 is slightly less than the temperature from said second thermocouple 20 then the low relay contact remains open because the steam trap is functioning properly. The low relay contact is also adjusted so that if the temperature from each of said thermocouples 16 and 20 is the same, then the contact closes thereby completing the signal generating alarm circuit via relay 30 which in turn activates signal indicating means, alarm 32 to indicate malfunctioning of the trap (process steam is being discharged through the trap). Said relay 26 is further adjusted so that if the temperature from said first thermocouple 16 is much less than the temperature from the second thermocouple 20, then the high contact on said relay 26 closes and in a like manner activates alarm 32 to indicate malfunction of the trap (condensate is accumulating in process steam conduit 12). Preferably said relay 30 is a time delay relay such as Model SCB available from Amerace Corp. Union, N.J., i.e., having timing means to delay activation of the alarm for a period of seconds or minutes, depending upon the application, to avoid activating the alarm for very brief and possibly self correcting malfunction of the steam trap.

The signal generating means can be any conventional alarm circuit for relaying the information from the signal from the closed contacts to the alarm, and includes, e.g., electronic, radio or microwave transmitters in addition to conventional electrical and pneumatic alarm circuits.

The alarm can be any known visual or acoustic device such as, e.g., a light, horn, buzzer, bell and the like. Said alarm may be disposed proximate to said steam trap, or disposed remotely, for example, in a control room or the like some distance from the steam trap, as desired, as is well known in industry.

In a typical operation, the electrical power circuit from source 27 to time delay relay 30 is open, the contacts 28 and 29 on said relay are wired to alarm 32 which is inactive. Malfunction of the steam trap, e.g., same high or low temperature sensed by both thermocouples, applies power to the time relay (via millivolt alarm device 26) and starts the delay timer. If the malfunction continues for a period longer than the preselected delay period, the time delay relay 30 activates alarm 32.

What is claimed is:

1. System for continuous detection of a steam trap for malfunctioning which comprises
   a steam trap having an inlet communicating with a source of steam, and having an outlet for discharge of gases which are noncondensable, and condensate;
   sensing means for detecting malfunction of said steam trap, said sensing means comprising a pair of thermocouples including a first thermocouple disposed proximate and in temperature measurement relationship to said outlet for measuring the temperature of said outlet and a second thermocouple disposed proximate and in temperature measurement relationship to said inlet for measuring the temperature of said inlet;
   signal generating means operatively connected to said sensing means for generating a signal indicative of malfunction of said steam trap; and
   signal indicating means responsive to said generated signal for indicating malfunctioning of said steam trap.

2. A system as in claim 1 wherein said signal indicating means is an alarm light.

3. A system as in claim 1 wherein said signal indicating means is an acoustical device.

4. A system as in claim 1, wherein said sensing means compares the temperature at said inlet and outlet and said signal generating means generates a signal upon the occurrence of preselected conditions.

5. A system as in claim 4 wherein said signal indicating means comprises both an alarm light and an acoustical device.

* * * * *